(12) United States Patent
Bartylla

(10) Patent No.: US 9,383,443 B2
(45) Date of Patent: Jul. 5, 2016

(54) ULTRASONIC SENSOR AND DEVICE AND METHOD FOR MEASURING A DISTANCE BETWEEN A VEHICLE AND AN OBSTACLE

(71) Applicant: Robert Bosch GmbH, Stuttgart (DE)

(72) Inventor: David Bartylla, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/404,792

(22) PCT Filed: Apr. 5, 2013

(86) PCT No.: PCT/EP2013/057247
§ 371 (c)(1),
(2) Date: Dec. 1, 2014

(87) PCT Pub. No.: WO2013/178390
PCT Pub. Date: Dec. 5, 2013

(65) Prior Publication Data
US 2015/0124564 A1    May 7, 2015

(30) Foreign Application Priority Data

May 31, 2012  (DE) .......................... 10 2012 209 238

(51) Int. Cl.
| | |
|---|---|
| *G01S 15/00* | (2006.01) |
| *G01S 15/08* | (2006.01) |
| *G01S 15/93* | (2006.01) |
| *G01S 7/521* | (2006.01) |
| *G10K 9/122* | (2006.01) |

(Continued)

(52) U.S. Cl.
CPC ................ *G01S 15/08* (2013.01); *G01S 7/521* (2013.01); *G01S 15/931* (2013.01); *G10K 9/122* (2013.01); *G10K 9/20* (2013.01); *G10K 11/18* (2013.01); *H04R 31/003* (2013.01); *H04R 31/006* (2013.01); *G01S 2015/932* (2013.01); *G01S 2015/938* (2013.01); *Y10T 29/49005* (2015.01); *Y10T 156/10* (2015.01)

(58) Field of Classification Search
CPC ........... G10K 9/22; G10K 9/122; G10K 9/20; G10K 9/18; H01L 41/053; G01S 2015/938; G01S 2015/932
See application file for complete search history.

(56) References Cited

U.S. PATENT DOCUMENTS

| | | | |
|---|---|---|---|
| 4,437,032 A | * | 3/1984 | Gelhard ........................ 310/324 |
| D416,211 S | | 11/1999 | Arnoux et al. |

(Continued)

FOREIGN PATENT DOCUMENTS

| | | |
|---|---|---|
| DE | 10 2008 000690 | 9/2009 |
| DE | 10 2008 040905 | 2/2010 |

(Continued)

*Primary Examiner* — Luke Ratcliffe
*Assistant Examiner* — Hovhannes Baghdasaryan
(74) *Attorney, Agent, or Firm* — Norton Rose Fulbright US LLP

(57) ABSTRACT

An ultrasonic sensor includes a housing having a peripheral side wall and a base surface, i.e., it is configured as essentially pot-shaped. The base surface is configured as a diaphragm. A transducer element, which is configured as a piezoelectric element, for example, and is used for generating and detecting ultrasonic oscillations, is situated on the base surface. At least one mass element is situated on the base surface so that the resistance of the mass element against an oscillation of the diaphragm increases with rising oscillation frequency.

14 Claims, 6 Drawing Sheets

(51) Int. Cl.
  *G10K 9/20* (2006.01)
  *G10K 11/18* (2006.01)
  *H04R 31/00* (2006.01)

(56) References Cited

U.S. PATENT DOCUMENTS

| | | | |
|---|---|---|---|
| 6,276,212 | B1 | 8/2001 | Cooper et al. |
| 6,465,935 | B1 * | 10/2002 | Wannke et al. ............... 310/324 |
| 2005/0203397 | A1 | 9/2005 | Degertekin |
| 2008/0108900 | A1 * | 5/2008 | Lee et al. ................... 600/459 |
| 2009/0140609 | A1 | 6/2009 | Huang |
| 2010/0148633 | A1 * | 6/2010 | Lee et al. ................... 310/335 |
| 2010/0249605 | A1 | 9/2010 | Degertekin |
| 2011/0259107 | A1 * | 10/2011 | Reiche ........................ 73/633 |

FOREIGN PATENT DOCUMENTS

| | | |
|---|---|---|
| EP | 1231481 | 8/2002 |
| EP | 1515303 | 3/2005 |
| GB | 2029160 | 3/1980 |

* cited by examiner

ULTRASONIC SENSOR AND DEVICE AND METHOD FOR MEASURING A DISTANCE BETWEEN A VEHICLE AND AN OBSTACLE

FIELD OF THE INVENTION

The present invention is directed to an ultrasonic sensor.

BACKGROUND INFORMATION

Ultrasonic sensors are believed to be understood in certain respects from the related art, which are used for distance measurement between vehicles and obstacles, for example, to assist a parking operation. The sensors have an oscillating diaphragm, which is generally excited via a piezo element in resonance to an oscillation. The sound signal generated in this way is emitted by the diaphragm of the ultrasonic sensor, reflected by an obstacle, and received by the same or an adjacent ultrasonic sensor. The distance between the sensor and the obstacle may be determined from the runtime of the sound signal. By applying the so-called trilateration principle, by way of comparison of the signals received by the emitting sensor itself (direct echo) and the signals received by adjacent sensors (cross echo), the position of the obstacle within the sensor plane may also be determined, in addition to the distance.

In general, the piezo element is situated on the base of a pot-like housing, which is installed, for example, in the bumper of the vehicle, the piezo element being connected to analysis electronics in such a way that the entirety of the unit forms the corresponding ultrasonic sensor. In order that the sound generated by the piezo element may be emitted or also received appropriately, the housings are shaped in such a way that they have a resonance in the frequency range of the ultrasonic waves used. The resonance is determined by the dimensions and the oscillation properties of the housing, in particular by the configuration of the diaphragm. Such ultrasonic sensors are discussed, for example, in DE 10 2008 040 905 A1.

Typically, at least four such sensors are installed on the rear end of the vehicle. For the reliable and precise determination of the distance to an obstacle, initially one of the sensors emits an ultrasonic signal. All sensors receive the echo signal. This operation is then carried out using each of the sensors in a fixed sequence until the final result of the measurement is provided and the cycle may begin from the beginning. The chronological resolution of the measurement is limited by the cycle duration.

SUMMARY OF THE INVENTION

To improve the chronological resolution of a device for distance measurement using ultrasonic sensors, it is conceivable to use ultrasonic signals having different frequencies. The various sensors may thus emit signals simultaneously or at very short time intervals, which may then be separated with the aid of a bandpass filter, for example. It is desirable to use structurally identical ultrasonic sensors.

The ultrasonic sensors which are typically used in automobiles emit sound signals having a fixed frequency, which corresponds to a resonant frequency of the ultrasonic sensor, and is typically in the range of 50 kHz. It is basically possible to operate an ultrasonic sensor at various frequencies which correspond to its natural frequencies of different orders. The diaphragm oscillates geometrically differently at various frequencies. Various oscillation modes thus result, not all of which, however, are suitable in the same way for the operation of an ultrasonic sensor in a vehicle, in particular for distance measurement, since due to the different oscillation modes, for example, different directional characteristics (emission characteristics) and therefore different sound pressures of the emitted sound waves result. Excessively high frequencies, for example, of greater than 100 kHz, are not suitable for a distance measurement in the case of a vehicle, since sound waves in this frequency range are very strongly attenuated by air.

An oscillation mode, the deflection of which may be approximately described by a half sine oscillation, is considered to be the fundamental oscillation or first oscillation mode of the diaphragm of an ultrasonic sensor here. If one considers an oscillation mode which has the form of a whole sine oscillation, one may thus refer to the second oscillation mode. If the third oscillation mode is described, the deflection of the diaphragm/plate thus has the curve of approximately one and one-half sine oscillations (see FIG. 7). This description applies in general to oscillating plates which are articulated. If the clamping of the plate is fixed, the oscillation mode in the edge area deviates due to a lesser deflection. The qualitative curve of the oscillation mode is maintained, however.

The transducer element, which excites the oscillation mode of the diaphragm, is typically fastened centrally on the diaphragm. So-called symmetrical oscillation modes, which represent an integral multiple of a sine oscillation—for example, the second oscillation mode—cannot be excited by a centrally situated transducer element, since the introduced energy precisely cancels out in this case. If the transducer element is not arranged precisely centrally, these symmetrical oscillation modes may be excited, but result in small deflections and therefore lower sound pressures. For this reason, the fundamental oscillation or the first oscillation mode and the third oscillation mode are primarily considered hereafter.

A diaphragm is understood in the context of the present invention as a thin plate which has a certain bending stiffness.

According to the present invention, an ultrasonic sensor is accordingly provided, which includes a housing including a peripheral side wall and a base surface, i.e., is configured as essentially pot-shaped. The base surface is configured in a known way as a diaphragm. A transducer element, which is configured as a piezoelectric element, for example, is situated on the base surface, and is used for generating and detecting ultrasonic oscillations. According to the present invention, at least one mass element is situated on the base surface in such a way that the resistance of the mass element against an oscillation of the diaphragm (impedance Z) increases with rising oscillation frequency. The force which is exerted by the at least one mass element on the diaphragm thus increases with rising frequency. A torque exerted by the at least one mass element on the diaphragm may also increase with rising frequency. The known relationship $Z=2·\pi·m·f$ exists between frequency f and impedance $Z\_longitudinal$, m being the oscillating mass. Technically speaking, this formula only applies for a longitudinal movement of the mass. In the event of an additional rotational movement of the mass, an additional component $Z\_rotation$ is also included: $Z\_rotation=\theta\ 2·\pi·f$, $\theta$ denoting the rotational inertia of the mass. Additional configuration options of the impedance result therefrom by way of geometric variations of the mass element, which influence total impedance Z.

Accordingly, by way of the arrangement of the at least one mass element, a fixation of the diaphragm is provided, which changes its behavior in a frequency-dependent way. By way of the arrangement of the mass element or the mass elements, at lower oscillation frequencies, the resistance of the mass element or the mass elements against the oscillation of the diaphragm is low, but it rises at higher frequencies. This effect takes place because different resonance frequencies induce different oscillation modes of the diaphragm. Accordingly, the mass elements may be situated in areas which only experience a slight deflection in the event of a first oscillation mode (fundamental oscillation) having a lower resonant frequency, but are deflected more strongly in the case of the third oscillation mode having a higher frequency.

Therefore, in the event of the excitation of an oscillation of higher order, a resonant frequency is achieved which is lower in relation to a fundamental frequency than if no mass element were present. It is therefore possible, for example, at a first resonant frequency $f_1$ of the fundamental oscillation, which is in the range of 30 kHz to 60 kHz, to achieve a second excitable resonant frequency $f_3$ of 100 kHz or less, which is associated with the third oscillation mode. The ratio of the resonant frequencies is in general determined by the arrangement, mass, and shape of the mass elements and the geometry and the selected material of the diaphragm.

The third oscillation mode may be changed by the defined positioning of the mass elements in such a way that the third oscillation mode is approximated in its shape and directional characteristic to the fundamental oscillation. The frequency and the directional characteristic of the third oscillation mode are thus advantageously as suitable for the distance determination with the aid of the ultrasonic sensor according to the present invention as the fundamental oscillation. The mass elements reduce the deflection of the diaphragm at the points at which they are attached. Therefore, in the event of excitation of the third oscillation mode, primarily the area of the diaphragm between the mass elements is deflected. As a result thereof, the overall oscillating area is reduced in size, which results in a broadening of the directional characteristic. The higher frequency in comparison to the fundamental oscillation results in a constriction of the directional characteristic at the same time. The two effects are opposing in the final analysis and cancel out completely in the ideal case. It is therefore possible by way of an arrangement according to the present invention for at least one mass element on the diaphragm to achieve a similar directional characteristic as in the fundamental oscillation mode using the third oscillation mode.

In one exemplary embodiment of an ultrasonic sensor according to the present invention, multiple mass elements are situated on the base surface. Since the transducer element may be fastened centrally on the base surface, the mass elements may be situated at regular intervals and/or symmetrically around the transducer element. The mass elements additionally may have an external surface, which is partially cylindrical in particular, and which is aligned concentrically to the peripheral side wall of the housing.

In one particularly advantageous embodiment, the ultrasonic sensor has two mass elements, which are situated mirror-symmetrically in relation to one another with respect to at least one center plane extending perpendicularly to the base surface. A symmetrical oscillation of the diaphragm is thus advantageously achieved.

To manufacture an ultrasonic sensor according to the present invention it is particularly advantageous if at least one of the mass elements has a substantially hollow-cylindrical structure or a structure like a hollow cylinder segment. In this case it is possible, for example, to implement the mass element or mass elements in that a thickening of the peripheral side wall of the housing is separated from the side wall by introducing a slot and therefore implements one or multiple mass elements. Since the base surface may be configured as circular and therefore the peripheral side wall is configured as essentially cylindrical, a hollow-cylindrical structure or a structure like a hollow cylinder segment of the mass element or the mass elements therefore results. The mass elements may have a height of 30% to 80% of the total height of the housing. Mass elements having a lesser or greater height are also conceivable, however.

The present invention also provides a method for manufacturing an ultrasonic sensor, which includes the following steps:
a. providing a housing including a peripheral side wall and a base surface, which is configured as a diaphragm, and on which a transducer element is attached for generating ultrasonic oscillations, the side wall having:
   a lower side wall section, in which the side wall has a rotationally asymmetrical profile in a plane parallel to the base surface; and
   an upper side wall section, in which the side wall merges toward an upper edge of the side wall into an essentially rotationally symmetrical profile
b. introducing a slot into the lower side wall section in such a way that at least one mass element situated on the base surface is formed.

The housing provided in step a. corresponds to an ultrasonic transducer housing, as is already typically used. Such a housing is described in DE 10 2008 040 905 A1. A housing for an ultrasonic sensor according to the present invention may also be manufactured in a simple way from such a housing by the method according to the present invention. By introducing one or multiple slots, which extend in particular axially or perpendicularly to the base surface, the regionally provided thickenings of the side wall in the lower side wall section are separated from the side wall. Mass elements therefore result, which are situated on the base surface, and which unfold the effect according to the present invention on the resonant frequencies of the ultrasonic sensor.

At least one mass element essentially in the form of a hollow cylinder segment may be formed from the lower side wall section.

Alternatively, an ultrasonic sensor according to the present invention may also be manufactured by joining mass elements of arbitrary shape to the diaphragm. A common method is gluing, for example.

Within the scope of the present invention, a device for measuring a distance between a vehicle and an obstacle is additionally specified. The device includes at least two acoustic sensors, which are situated on a vehicle, the sensors being configured as ultrasonic sensors according to the present invention and accordingly being able to be operated at at least two different resonant frequencies.

The device is capable of carrying out the method described hereafter for determining a distance between a vehicle and an obstacle:
   a first sensor emits an acoustic signal of a first frequency,
   a second sensor emits, simultaneously or within an established emission cycle time, an acoustic signal of a second frequency, which is different from the first frequency,
   a first echo signal of the first acoustic signal is detected by at least one of the sensors,
   a second echo signal of the second acoustic signal is detected by at least one of the sensors,
   the distance between the vehicle and the obstacle is calculated as a function of the detected variables.

The established emission cycle time is understood as a time interval within which the determination of the distance is completed. In the related art, i.e., if ultrasonic sensors having identical emission frequencies are used, only one sensor may emit its signal within the emission cycle time. This restriction is no longer necessary in the measuring method according to the present invention, since two different emission frequencies are available. The first sensor and the second sensor ideally emit an acoustic signal simultaneously.

As is immediately apparent, using more than two, for example, four or six, sensors for such a method is also within the scope of the present invention. For example, groups of two sensors each may be formed, which each emit simultaneously at different frequencies. The measurement time is therefore reduced, ideally by a factor of two, in comparison to conventional systems.

The echo signal of the first acoustic signal and the echo signal of the second acoustic signal may be received by one sensor, a separation of the signals being carried out, in particular with the aid of a bandpass filter.

The present invention will be explained hereafter on the basis of the exemplary embodiments and appended figures.

DETAILED DESCRIPTION

Figure 1A:
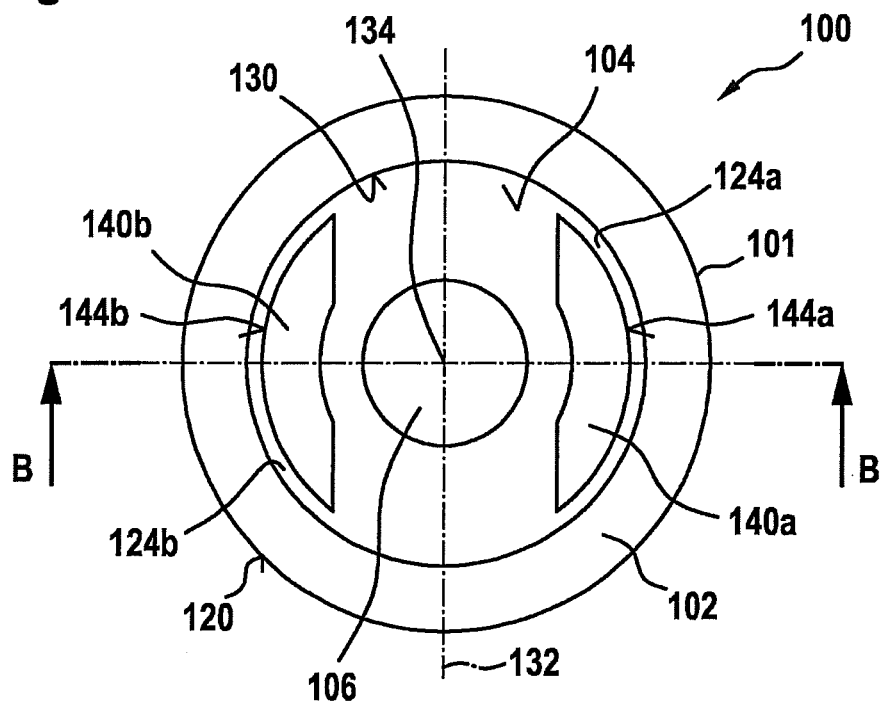
FIG. 1A shows a top view of an ultrasonic sensor according to one embodiment of the present invention.

FIG. 1A shows a top view of an ultrasonic sensor 100, which is suitable for use in a parking assistance system for a motor vehicle. The ultrasonic sensor includes a pot-like housing 101 including a base surface 104 and a side wall 102, which encloses it in a ring shape. Housing 101 is molded or milled from a metallic material, for example, aluminum, and coated with a primer for protection from corrosion.

The view of the observer of the illustration falls from above into the interior of housing 101, so that the inner side of base surface 104 faces toward the observer. An electromechanical transducer element 106, for example, a piezo element in the form of a cylindrical disk, is attached, for example, glued, to the inner side of base surface 104, and contacted. For the sake of clarity, the illustration of the contacting is omitted. The remaining space in the interior of housing 101 is filled with a damping material (also not shown). Furthermore, housing 101 shown may be enclosed by further envelopes, for example, made of soft elastomeric materials.

Side wall 102 has on its upper edge, on which the view of the observer in FIG. 1A falls, an edge surface lying in parallel to the plane of the drawing and to base surface 104, which is delimited by two concentric circular lines, the center point of which lies on an axis of symmetry 134, in relation to which an external contour 120 of housing 101 is configured to be rotationally symmetrical.

Two mass elements 140a and 140b are implemented on base surface 104. Mass elements 140a and 140b have a footprint in the form of a ring segment and are situated opposite to one another and mirror-symmetrically in relation to a plane of symmetry 132, plane of symmetry 132 extending perpendicularly to base surface 104 and containing axis of symmetry 134. Mass elements 140a and 140b each have a cylindrical external contour surface 144a and 144b, which are each separated or spaced apart from inner surface 130 of side wall 102 by a gap or slot 124a and 124b. Mass elements 140a and 140b are situated on base surface 104 in such a way that the resistance of the mass element to an oscillation of the diaphragm (impedance) increases with rising oscillation frequency. Mass elements 140a and 140b may be configured in one piece with housing 101, or may be applied as separate components to surface 104.

Figure 1B:
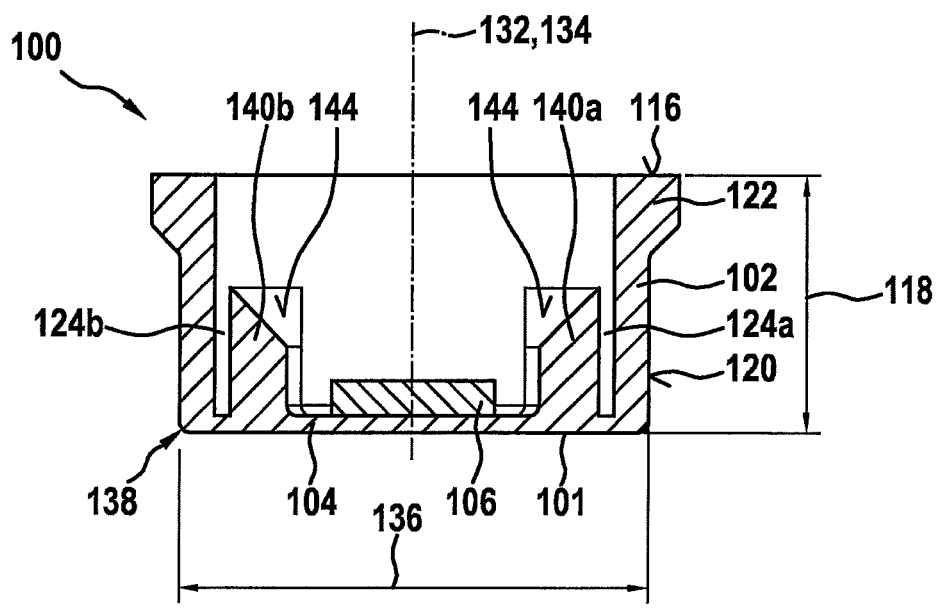
FIG. 1B shows a sectional view of the ultrasonic sensor from FIG. 1A.

FIG. 1B shows a sectional view of ultrasonic sensor 100 from FIG. 1A along a sectional plane marked with B-B in FIG. 1A, which extends through axis of symmetry 134 of external contour 120. External contour 120 is formed extending over the predominant part of an overall height 118 of housing 101 in the form of a cylinder having external diameter 136, the cylinder axis lying on axis of symmetry 134. External contour 120 deviates from a cylinder shape in that a thickening 122, which acts as a stabilization ring, is implemented on upper edge 116 of housing 101 in a known way, and furthermore lower edge 138 of side wall 102 is rounded, at which side wall 102 comes together with the outer side of base surface 104.

It is apparent from observing FIGS. 1A and 1B together that mass elements 140a and 140b each have essentially the shape of a hollow cylinder segment, end faces 144 of the mass elements each having a bevel in this exemplary embodiment. Other configurations are also conceivable, for example, a flat configuration of end faces 144 extending in parallel to the base surface, or a concave or convex profile.

Figure 2:
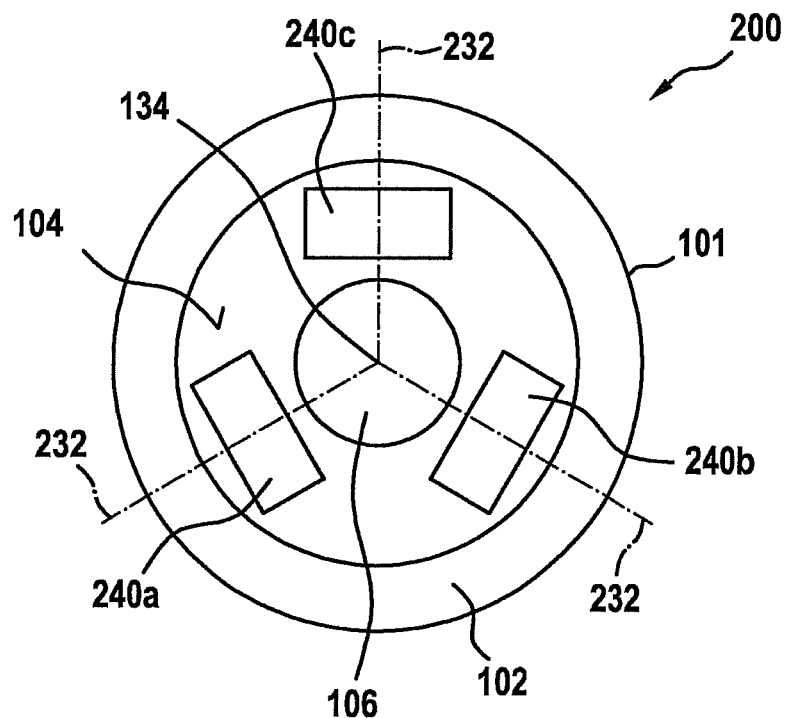
FIG. 2 shows a top view of an ultrasonic sensor according to a second embodiment of the present invention.

FIG. 2 shows a top view of an alternative embodiment of an ultrasonic sensor 200 according to the present invention. The construction essentially corresponds to that of ultrasonic sensor 100 shown in FIG. 1. Identical elements are provided with identical reference numerals. In contrast to the embodiment shown in FIG. 1, in ultrasonic sensor 200 shown, three mass elements 240a, 240b, and 240c are situated on base surface 104. Mass elements 240a, 240b, and 240c have a rectangular footprint and are configured to be essentially cubic. They are situated regularly around piezoelectric transducer element 106, center axes 232 of mass elements 240a, 240b, and 240c intersecting at axis of symmetry 134 and adjacent center axes 232 enclosing an angle of 120° between themselves in each case.

Figure 3:
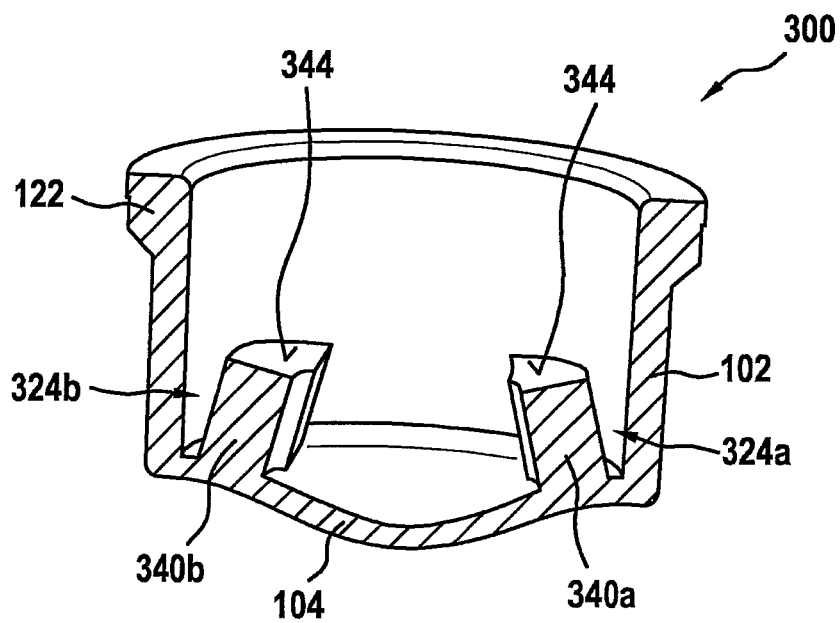
FIG. 3 shows a sectional view of an ultrasonic sensor according to a third embodiment of the present invention including a first excited oscillation mode.

FIG. 3 shows a sectional view of an alternative embodiment of an ultrasonic sensor 300 according to the present invention. The construction essentially corresponds to that of ultrasonic sensor 100 shown in FIG. 1. Identical elements are provided with identical reference numerals. In the selected illustration, a deflection of base surface 104 in the event of an excitation of the first oscillation mode is shown in exaggerated form. The illustration of transducer element 106, which is situated centrally on base surface 104, was omitted for the sake of clarity. Two mass elements 340a and 340b are situated on base surface 104. Mass elements 340a and 340b are configured essentially as hollow cylinder segments, which are situated opposite to one another on base surface 104. End faces 344 of mass elements 340a and 340b are implemented in parallel to base surface 104 in this exemplary embodiment, with respect to a non-oscillating state of ultrasonic sensor 300.

As is apparent from the illustration of the deflection of base surface 104 in the illustrated first oscillation mode, a comparatively small deflection is present in the areas of the base surface in which mass elements 340a and 340b are situated.

Figure 4:
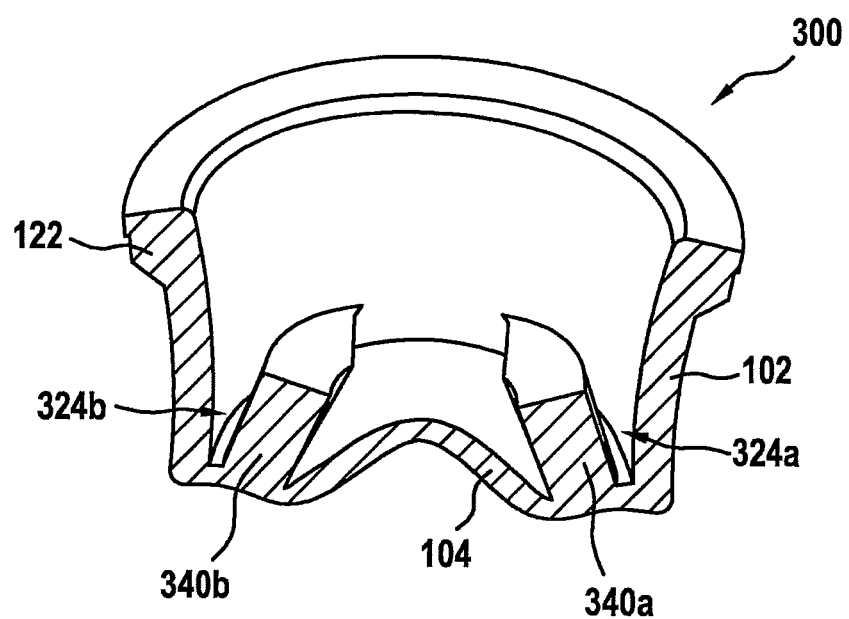
FIG. 4 shows a sectional view of the ultrasonic sensor according to the third embodiment of the present invention including a second excited oscillation mode.

FIG. 4 shows a sectional view of ultrasonic sensor 300 from FIG. 3, a deflection of base surface 104 in the event of an excitation of the third oscillation mode being shown in exaggerated form in this figure. As is apparent from the illustration of the deflection of base surface 104 in the illustrated oscillation mode, in the case of excitation of the third oscillation mode, a large deflection in comparison to the first oscillation mode is present in the areas of the base surface in which mass elements 340a and 340b are situated. The resistance which mass elements 340a and 340b exert against the oscillation of base surface 104 is accordingly stronger than in the first oscillation mode. The resonant frequency of the third oscillation mode thus shifts toward lower frequencies. Furthermore, both oscillation modes have a similar directional characteristic of the emitted ultrasonic waves due to the arrangement of mass elements 340a and 340b.

It is also clearly apparent in FIG. 4 that in the event of excitation of ultrasonic sensor 300 by transducer element 106 (not shown), not only base surface 104 carries out an oscillation. Side wall 102 also experiences a deformation, although it is significantly weaker.

Figure 5:
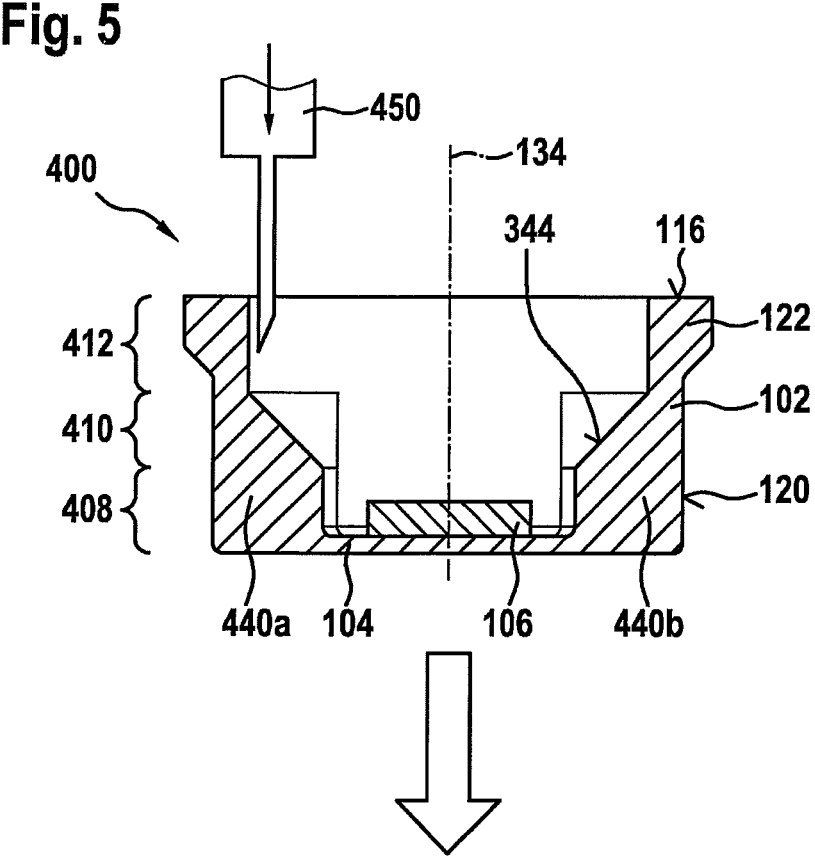
FIG. 5 shows a method according to the present invention for manufacturing an ultrasonic sensor according to FIG. 1.
Figure 5:
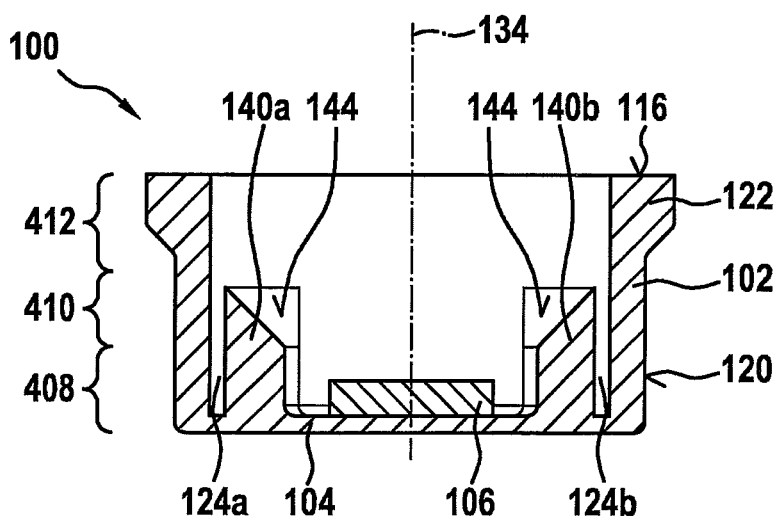

FIG. 5 illustrates a method according to the present invention for manufacturing an ultrasonic sensor 100, which corresponds in this example to ultrasonic sensor 100 shown in FIG. 1. For this purpose, a housing 400 is initially provided. Housing 400 has a peripheral side wall 102 and a base surface 104, which is configured as a diaphragm. A transducer element 106 for generating ultrasonic oscillations is attached to base surface 104. Side wall 102 has a lower side wall section 408, in which side wall 102 has a rotationally asymmetrical profile in a plane parallel to surface 104. This is implemented by two thickenings 440a and 440b, which are configured as opposing thickenings of side wall 102 in lower side wall section 408 and in transition section 410. Furthermore, side wall 102 has an upper side wall section 412, in which side wall 102 merges toward an upper edge 116 of side wall 102 into an essentially rotationally symmetrical profile. In a transition section 410, in contrast, inner contour 344 of the thickenings in areas 440a and 440b extends into those sections which lie outside the outline of base surface 104 in the projection along axis of symmetry 134, in contrast, along a lateral surface 344 of a cone tapering downward, the tip of which lies on axis of symmetry 134.

With the aid of a suitable tool 450, which is only schematically indicated here, two vertical slots 124a and 124b are introduced into transition section 410 and into lower side wall section 408, whereby two mass elements 140a and 140b are implemented from the two opposing thickenings formed by areas 440a and 440b, as shown in the lower part of FIG. 5.

Due to the increase of the total mass of oscillating diaphragm 104 by mass elements 140a and 140b, the frequency of the first natural oscillation is reduced in comparison to housing 400 prior to the introduction of slots 124a and 124b. A lower frequency may actually indicate an enlargement of the opening angle of the emitted sound. However, because a larger area which also oscillates results, an acoustic focusing of the emitted sound takes place, so that the directional characteristic of ultrasonic sensor 100 does not experience a large change in relation to the directional characteristic of housing 400.

Figure 6:
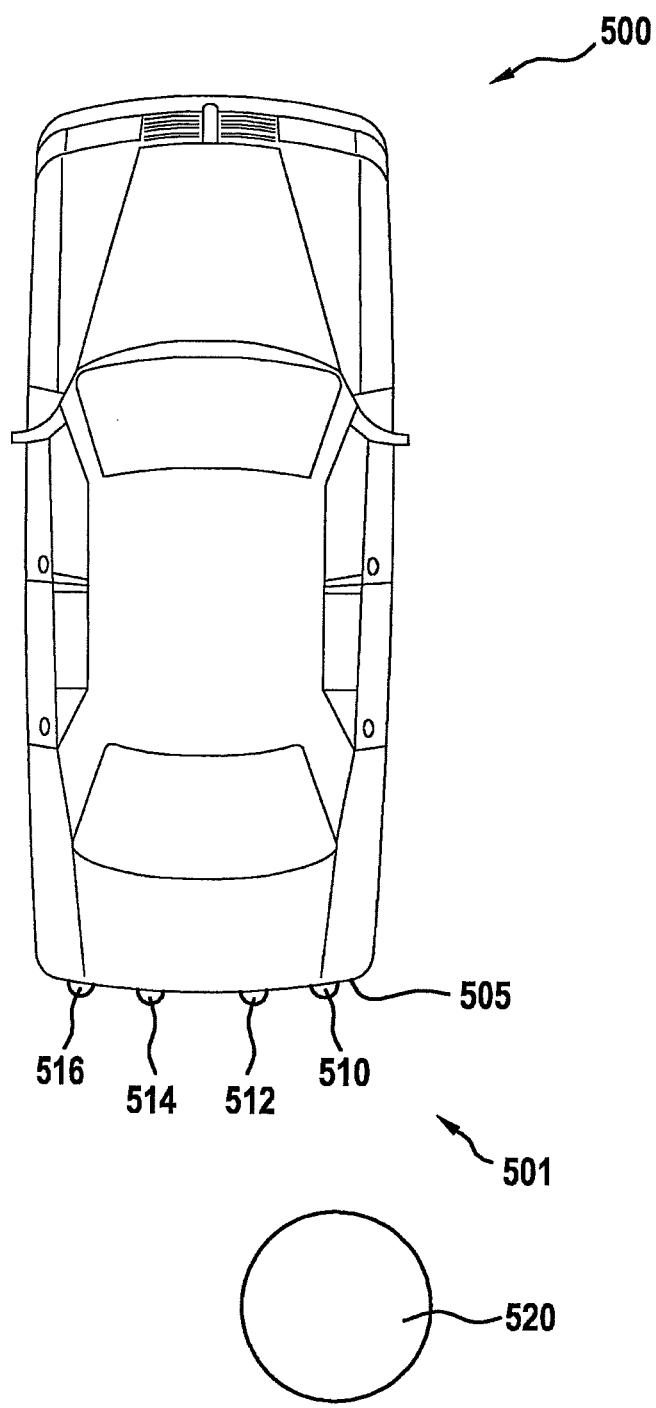
FIG. 6 schematically shows a vehicle including a device for distance measurement according to the present invention.

FIG. 6 shows a vehicle 500 including a device 501 according to the present invention for measuring a distance between vehicle 500 and an obstacle 520. Device 501 may be part of a parking assistance system, for example. The device includes four ultrasonic sensors 510, 512, 514, and 516, which are situated on rear bumper 505 of vehicle 500. Ultrasonic sensors 510, 512, 514, and 516 are constructed according to the present invention, for example, according to one of the exemplary embodiments from FIGS. 1 through 4. All ultrasonic sensors may be constructed identically. Alternatively or additionally, it is possible to attach ultrasonic sensors 510, 512, 514, and 516 to the front bumper and/or to the sides of vehicle 500. It is also possible to use more or fewer ultrasonic sensors.

The method according to the present invention for distance measurement may be carried out using device 501. In a first phase of the measurement, a first ultrasonic sensor 510 emits an acoustic signal at a first frequency of 50 kHz, for example. This corresponds to the excitation of the 1-1 oscillation mode of ultrasonic sensor 510. A second ultrasonic sensor 512 simultaneously emits an acoustic signal at a second frequency of 80 kHz, for example. This corresponds to the excitation of the 3-1 oscillation mode of ultrasonic sensor 512. Both acoustic signals are reflected on obstacle 520. The echo signals are received by all ultrasonic sensors 510, 512, 514, and 516. Each ultrasonic sensor 510, 512, 514, and 516 may recognize, due to the different frequencies of the echo signals, from which ultrasonic sensor 510 or 512 the output signal was emitted, for example, by signal separation with the aid of a bandpass filter. The distance and the position of obstacle 520 in relation to vehicle 500 may be determined in a known way from the runtimes of the echo signals and the known distances of ultrasonic sensors 510, 512, 514, and 516 from one another with the aid of analysis electronics (not shown).

In a second phase of the measurement, a third ultrasonic sensor 514 emits an acoustic signal at a first frequency of 50 kHz, for example. A fourth ultrasonic sensor 516 simultaneously emits an acoustic signal at a second frequency of 80 kHz, for example. Both acoustic signals are again reflected on obstacle 520 and the echo signals are received by all ultrasonic sensors 510, 512, 514, and 516. The separation of the signals takes place as already in the first phase of the measurement by separation of the frequencies, for example, by a bandpass filter. The second phase of the measurement is used for validating and increasing the precision of the first measurement.

Because two ultrasonic sensors 510 and 512 and also 514 and 516 may always emit simultaneously or at very short time intervals, the total measurement time is shortened by approximately a factor of two.

Basically, it is also conceivable to provide an ultrasonic sensor within the scope of the present invention, which has three or more excitable resonant frequencies, which are in a frequency range usable for the distance measurement of less than 100 kHz, which may be less than 80 kHz. In this case, the measuring method according to the present invention could provide three or more simultaneously emitting ultrasonic sensors.

Figure 7:
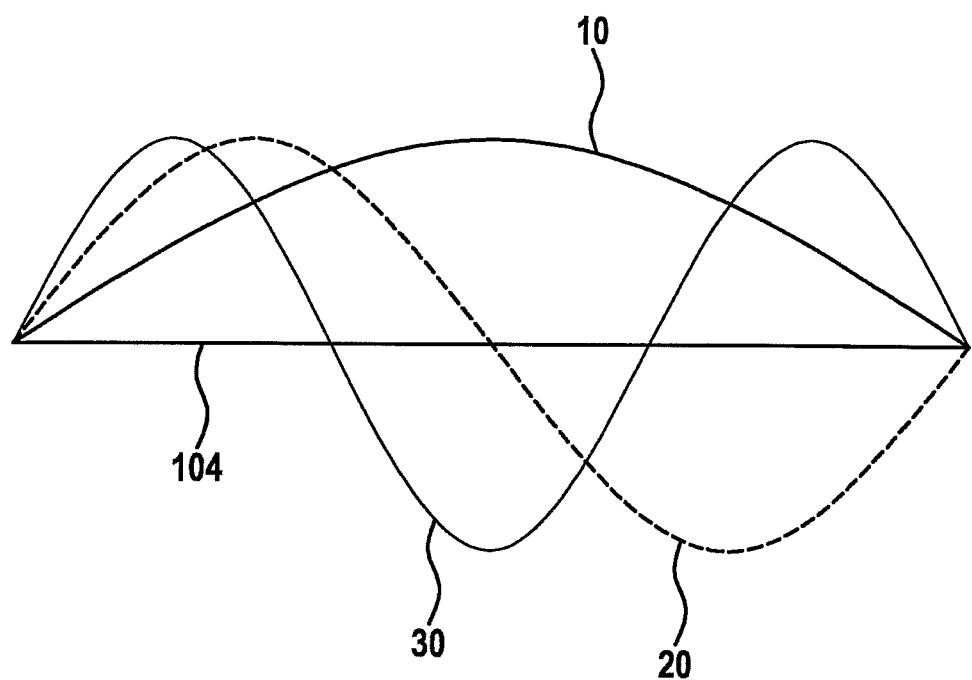
FIG. 7 schematically shows various oscillation modes of a diaphragm.

FIG. 7 schematically shows a diaphragm 104, and also a first oscillation mode (fundamental form) 10 of the diaphragm in the state of maximum deflection, which essentially corresponds to a half sine oscillation. Furthermore, a second oscillation mode 20 is shown, which essentially corresponds to a whole sine oscillation. Second oscillation mode 20 is a so-called symmetrical oscillation mode, which corresponds to an integer multiple of a sine oscillation. Second oscillation mode 20 may not be excited by a transducer element (not shown) situated centrally on diaphragm 104. Furthermore, third oscillation mode 30 is shown, which essentially corresponds to a one and one-half sine oscillation.

What is claimed is:

1. An ultrasonic sensor, comprising:
a housing having a peripheral side wall and a base surface, which is configured as a diaphragm;
a transducer element, situated on the base surface, for generating and detecting ultrasonic oscillations; and
at least one mass element situated on the base surface so that at least one of a force and a torque exerted by the at least one mass element on the diaphragm increases with rising oscillation frequency;
wherein the at least one mass element is configured to be essentially hollow-cylindrical or in the form of a hollow cylinder segment.

2. The ultrasonic sensor of claim 1, wherein a resonant frequency of a first natural oscillation of the ultrasonic sensor is 30 kHz to 60 kHz, and wherein a frequency of a next excitable natural oscillation is less than 100 kHz.

3. The ultrasonic sensor of claim 1, wherein the ultrasonic sensor has two mass elements, which are situated mirror-symmetrically in relation to one another with respect to a plane of symmetry extending perpendicularly to the base surface.

4. The ultrasonic sensor of claim 1, wherein at least one mass element has an external surface, which is partially cylindrical in particular, and which is aligned concentrically to the peripheral side wall.

5. The ultrasonic sensor of claim 1, wherein the at least one mass element has a height of 30% to 80% of a total height of the housing.

6. The ultrasonic sensor of claim 1, wherein a resonant frequency of a first natural oscillation of the ultrasonic sensor is 30 kHz to 60 kHz, and wherein a frequency of a next excitable natural oscillation is less than 80 kHz.

7. An ultrasonic sensor, comprising:
a housing having a peripheral side wall and a base surface, which is configured as a diaphragm;
a transducer element, situated on the base surface, for generating and detecting ultrasonic oscillations; and
at least one mass element situated on the base surface so that at least one of a force and a torque exerted by the at least one mass element on the diaphragm increases with rising oscillation frequency;
wherein the transducer element is situated centrally on the base surface; and
wherein the at least one mass element has an impedance which changes a third oscillation mode of the diaphragm so that the third oscillation mode of the diaphragm approximates a first oscillation mode of the diaphragm.

8. The ultrasonic sensor of claim 7, wherein a directional characteristic of the third oscillation mode of the diaphragm is adapted to a directional characteristic of the first oscillation mode of the diaphragm.

9. A method for manufacturing an ultrasonic sensor, the method comprising:
providing a housing having a peripheral side wall and a base surface, which is configured as a diaphragm, and on which a transducer element is attached for generating ultrasonic oscillations, wherein the side wall has a lower side wall section, in which the side wall has a rotationally asymmetrical profile in a plane parallel to the base surface, and an upper side wall section, in which the side wall merges toward an upper edge of the side wall into an essentially rotationally symmetrical profile; and
introducing at least one slot into the lower side wall section so as to form at least one mass element situated on the base surface;
wherein the introduction of the slots occurs so that at least one area of the lower side wall section is formed as the at least one mass element essentially in the form of a hollow cylinder segment.

10. The method for manufacturing an ultrasonic sensor, the method comprising:
providing a housing having a peripheral side wall and a base surface, which is configured as a diaphragm, and on which a transducer element is attached for generating ultrasonic oscillations, at least one mass element being attached to the diaphragm by joining;
wherein the ultrasonic sensor includes:
the housing having a peripheral side wall and the base surface, which is configured as the diaphragm;
the transducer element, situated on the base surface, for generating and detecting the ultrasonic oscillations; and
the at least one mass element situated on the base surface so that at least one of a force and a torque exerted by the at least one mass element on the diaphragm increases with rising oscillation frequency;
wherein the at least one mass element is configured to be essentially hollow-cylindrical or in the form of a hollow cylinder segment.

11. The method of claim 10, wherein the joining is done by gluing.

12. A device for measuring a distance between a vehicle and an obstacle, comprising:
at least two acoustic sensors, which are situated on the vehicle;
wherein each of the sensors includes:
a housing having a peripheral side wall and a base surface, which is configured as a diaphragm;
a transducer element, situated on the base surface, for generating and detecting ultrasonic oscillations; and
at least one mass element situated on the base surface so that at least one of a force and a torque exerted by the at least one mass element on the diaphragm increases with rising oscillation frequency
wherein the at least one mass element is configured to be essentially hollow-cylindrical or in the form of a hollow cylinder segment.

13. A method for determining a distance between a vehicle and an obstacle using a device, the method comprising:
emitting, using a first ultrasonic sensor, an acoustic signal of a first frequency;
emitting, using a second ultrasonic sensor, an acoustic signal of a second frequency simultaneously or within a fixed emission cycle time;
detecting a first echo signal of the first acoustic signal by at least one of the ultrasonic sensors;
detecting a second echo signal of the second acoustic signal by at least one of the ultrasonic sensors; and
determining the distance between the vehicle and the obstacle as a function of the detected variables;
wherein the device includes at least two acoustic sensors, which are situated on the vehicle, and wherein each of the acoustic sensors includes:
a housing having a peripheral side wall and a base surface, which is configured as a diaphragm;
a transducer element, situated on the base surface, for generating and detecting ultrasonic oscillations; and
at least one mass element situated on the base surface so that at least one of a force and a torque exerted by the at least one mass element on the diaphragm increases with rising oscillation frequency;

wherein the at least one mass element is configured to be essentially hollow-cylindrical or in the form of a hollow cylinder segment.

14. The method of claim 13, wherein the echo signal of the first acoustic signal and the echo signal of the second acoustic signal are received by one of the two ultrasonic sensors, and wherein a separation of the signals occurs using a bandpass filter.

* * * * *